Oct. 30, 1928.

P. H. LANGE 1,689,247

CONVEYING AND ACCELERATING DEVICE

Filed Sept. 17, 1926   5 Sheets-Sheet 1

Inventor
Paul H. Lange
By his Attorney

Oct. 30, 1928.
P. H. LANGE
1,689,247
CONVEYING AND ACCELERATING DEVICE
Filed Sept. 17, 1926    5 Sheets-Sheet 2
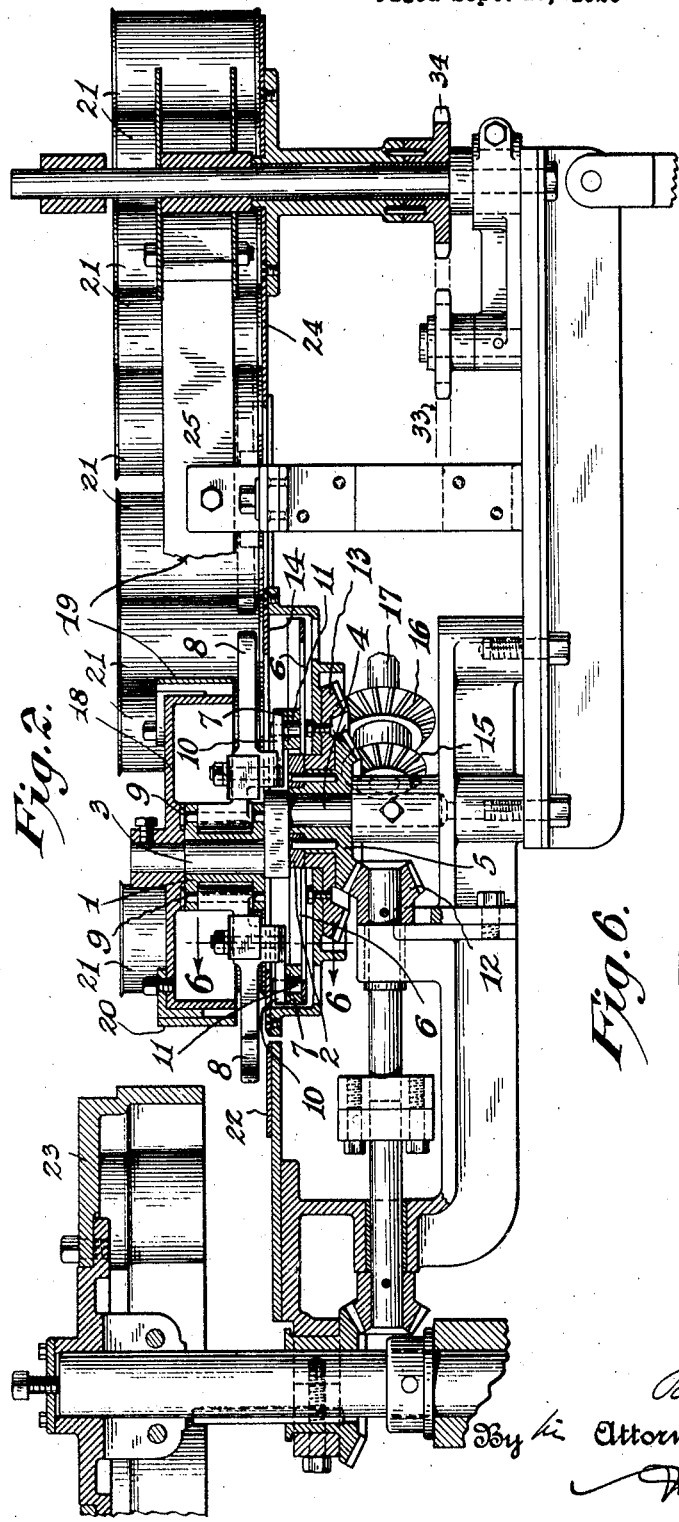
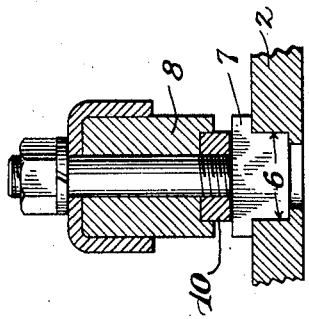
Inventor
Paul H Lange
By his Attorney

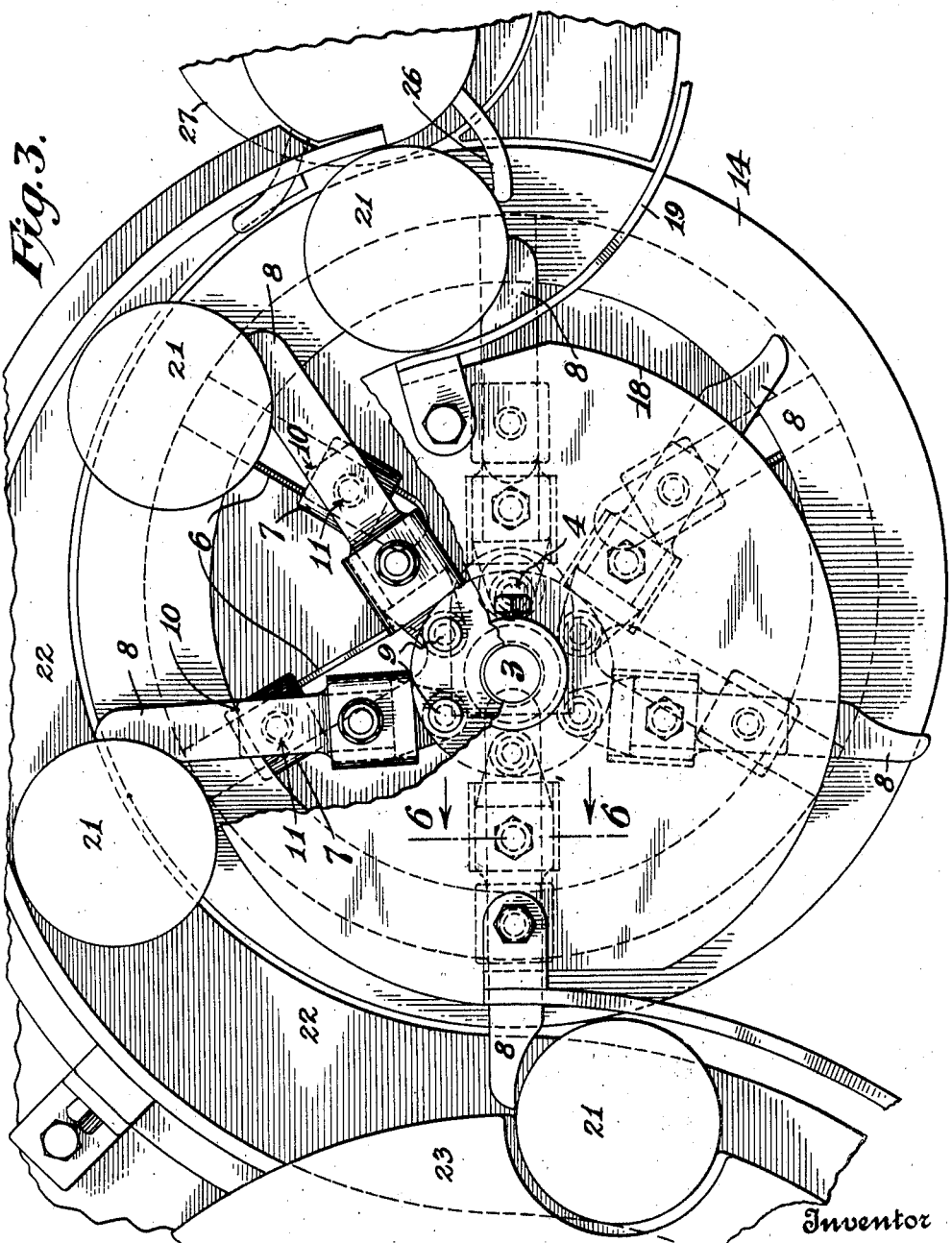

Oct. 30, 1928.
P. H. LANGE
1,689,247
CONVEYING AND ACCELERATING DEVICE
Filed Sept. 17, 1926   5 Sheets-Sheet 4
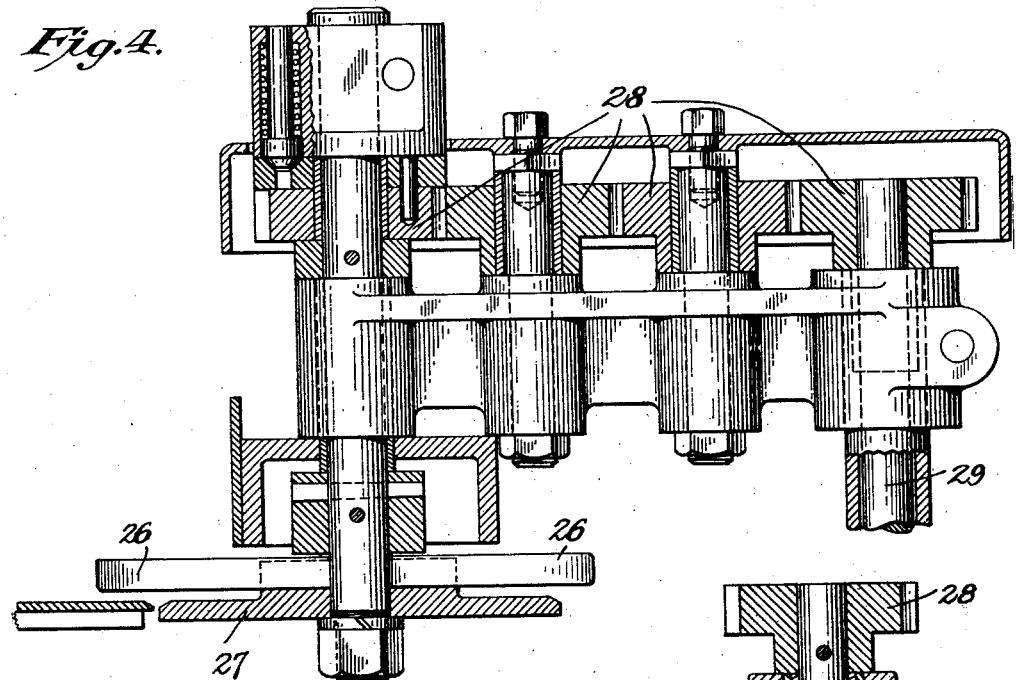
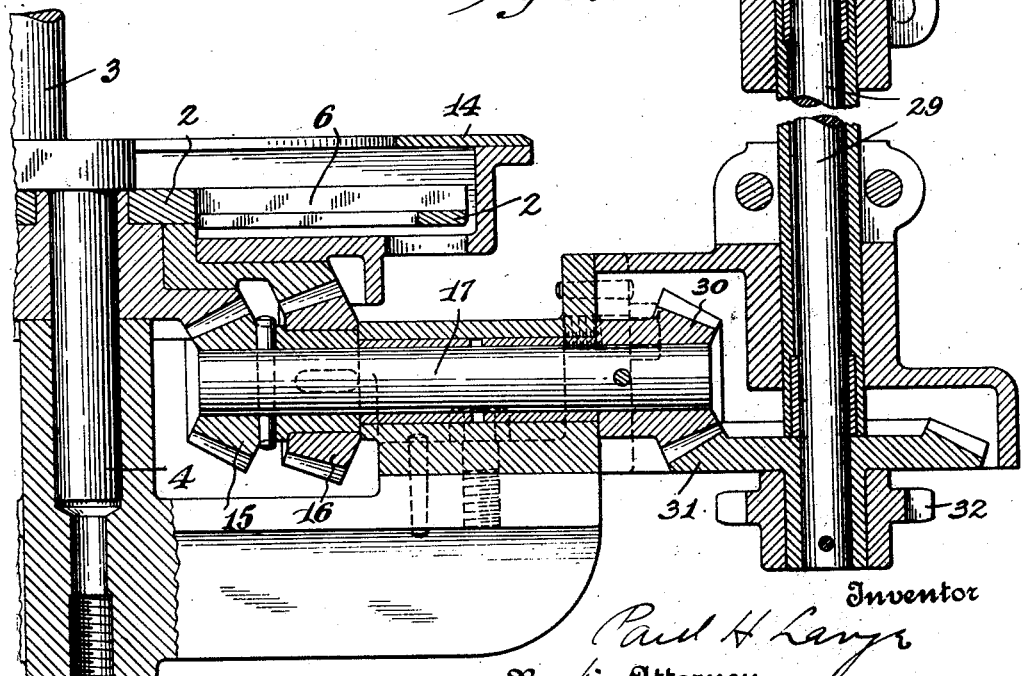

Oct. 30, 1928.

P. H. LANGE 1,689,247

CONVEYING AND ACCELERATING DEVICE

Filed Sept. 17, 1926    5 Sheets-Sheet 5

Inventor
Paul H Lange
By his Attorney

Patented Oct. 30, 1928.

1,689,247

UNITED STATES PATENT OFFICE.

PAUL H. LANGE, OF BRIDGEPORT, CONNECTICUT, ASSIGNOR TO THE MAX AMS MACHINE COMPANY, OF BRIDGEPORT, CONNECTICUT, A CORPORATION OF NEW YORK.

CONVEYING AND ACCELERATING DEVICE.

Application filed September 17, 1926. Serial No. 136,047.

This invention relates to conveying and accelerating devices of the character used in feeding bodies or containers to seaming or other machines, and has for its main object and feature the provision of compact and simple means to effect the separation and acceleration of bodies. This invention is an improvement upon that disclosed in Patent No. 1,330,596.

In the accompanying drawings the invention is disclosed in several concrete and preferred forms in which:

Fig. 2 is a vertical sectional view substantially in the plane of line 2—2 of Fig. 1:

Fig. 3 is a top plan view of a portion of Fig. 1, on an enlarged scale and with parts broken away:

Fig. 4 is a vertical sectional view substantially in the plane of line 4—4 of Fig. 1:

Fig. 5 is a vertical sectional view substantially in the plane of line 5—5 of Fig. 1:

Fig. 6 is a detail sectional view substantially in the plane of line 6—6 of Fig. 2:

Figure 1:
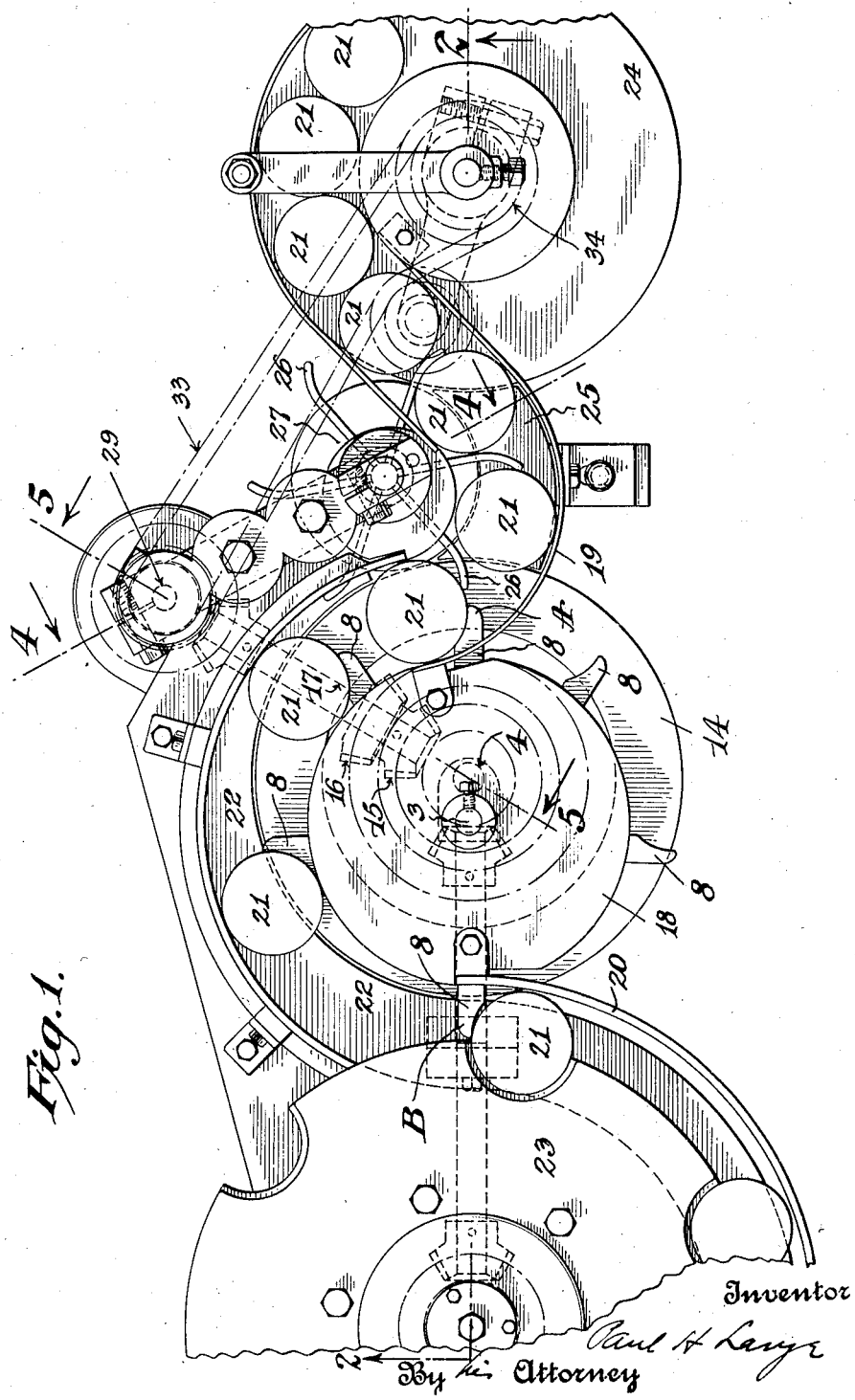
Fig. 1 is a top plan view of a device embodying a preferred form of the invention.

1 and 2 indicate two rotatable members eccentrically disposed with respect to each other, said members being here mounted on stationary shafts 3 and 4 which for the sake of convenience are made in the form of a crank. In the present instance, member 2 is pinned to bevel gear 5, loosely surrounding shaft 4, and is driven thereby. Member 2 is provided with a series of radial slots 6 in which are slidably engaged shoes 7. Pivotally carried by member 1 are a plurality of body engaging arms 8, the pivot points being indicated at 9; and carried by each arm is an extension 10 pivotally connected at 11 to a shoe. It will be seen from this that member 1 is rotated from member 2 by means of a pin-and-slot connection and that arms 8 partake of a variable movement in a manner well understood. Motion may be imparted to bevel gear 5 in any suitable manner as by means of bevel pinion 12. 13 is a second bevel gear also loosely surrounding shaft 4 and connected to this bevel gear is a body support 14 that rotates at a slightly lesser speed than the arms of member 1 at the point where they first engage the bodies. Suitable means are provided to drive bevel gear 13 from bevel gear 5, in this instance taking the form of two bevel pinions 15 and 16 mounted on shaft 17, 15 engaging 5 and 16 engaging 13. Surrounding member 1 is a casing 18 attached to shaft 3 and carried by this casing are guides 19 and 20 that direct bodies 21 to and from arms 8.

It will be understood that bodies reaching point A are thereby brought on rotating support 14 and are taken by arms 18 which gradually accelerate their speed, support 14 moving at a slightly lesser speed than arms 8 at point A so as to insure engagement of the body and arm and at the same time avoiding bringing the bodies, which are filled, to a state of rest. The bodies, under the influence of arms 8, are gradually brought over auxiliary support 22 and are taken into turret 23 at point B at the proper speed and with very little jarring.

The bodies are usually fed into the machine by a rotating disc 24 and thence through channel 25 where a primary separating and feeding device may act upon them. As here shown, this feeding device carries a number of fingers 26 mounted upon a rotating member 27 and the relation between channel 25 and the orbit of finger 26 is eccentric so as to separate and slightly accelerate the bodies as shown. Member 27 may be driven in any suitable manner but preferably there is a series of spur gears 28 that extend from upright shaft 29 to member 27. Shaft 29 is driven by shaft 17 which carries a bevel pinion 30 meshing with bevel gear 31. In addition, shaft 29 drives disc 24 by means of sprocket wheel 32, chain 33 and sprocket wheel 34.

Figure 7:
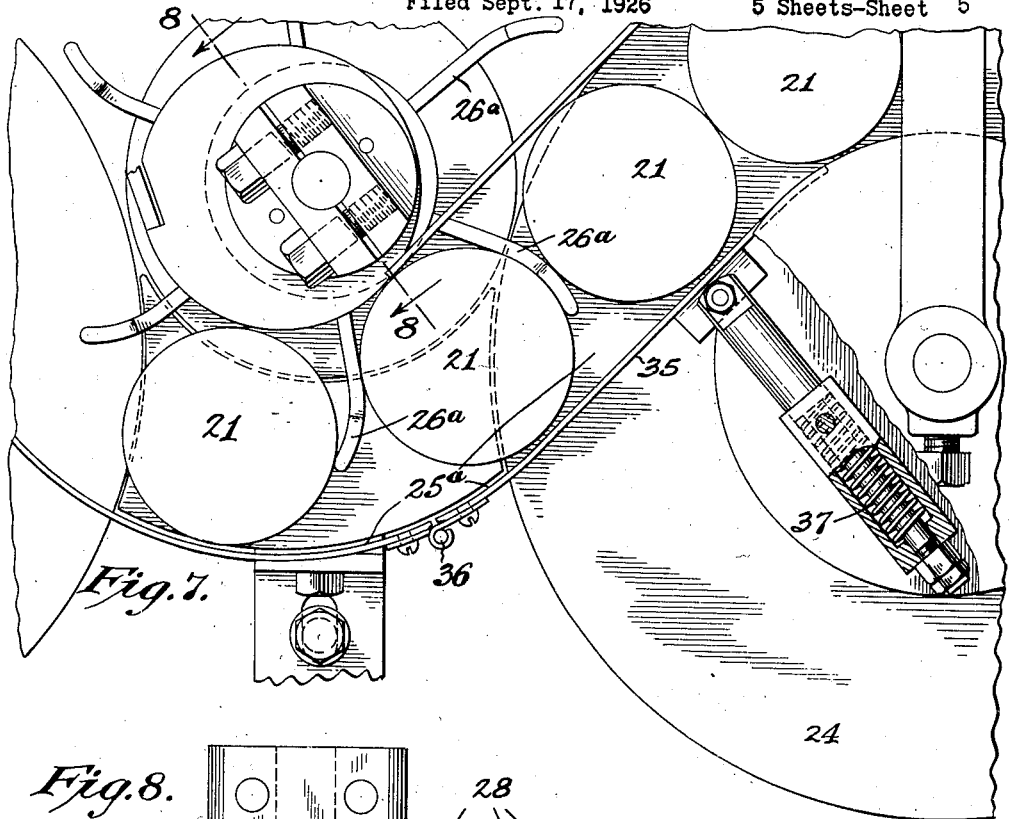
Fig. 7 is a top plan view of a portion of Fig. 1, on an enlarged scale, showing a modified form of the invention.
Figure 8:
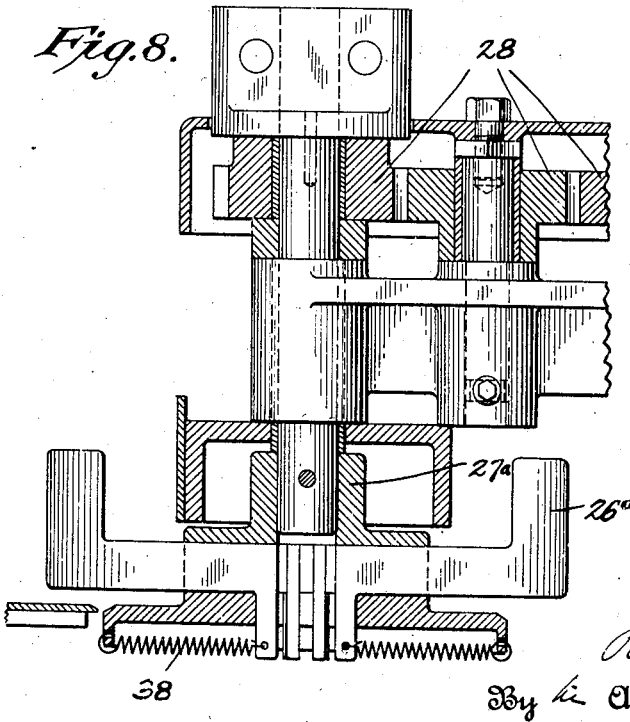
Fig. 8 is a vertical sectional view substantially in the plane of line 8—8 of Fig. 7.

In Figures 7 and 8 is shown a modification of the invention, in which one of the walls 35 of channel 25ª is hinged at 36 and spring pressed by means of spring 37 so that, in case fingers 26ª should happen to push a body sideways, the parts will yield. Also it may be desirable to mount fingers 26ª yieldingly by slidingly supporting said fingers in 27ª and using springs 38 to normally extend said fingers and at the same time enable them to move inwardly under stresses.

I claim:

1. A conveying and accelerating device including: two rotatable members eccentrically disposed with respect to each other, a body engaging arm pivotally connected to one of said members, a pin and slot connection between said arm and the other member whereby the one member is driven from the other, and a support for the body driven at a speed slightly less than that of the arm at the point where it first engages the body.

2. A conveying and accelerating device including: a shaft, a rotatable member, having slots, concentrically disposed around said shaft, a support for bodies also concentrically disposed around said shaft, means for driving said member and support at different speeds, the support being driven at a slightly lesser speed than the member, a second rotatable member eccentrically disposed with respect to the first member, a plurality of pivotally supported arms carried by the second member, shoes, slidable in the slots, and pivotal connections between the shoes and the arms.

3. A conveying and accelerating device including: a shaft, a rotatable member, having slots, concentrically disposed around said shaft, a support for bodies also concentrically disposed around said shaft, means for driving said member and support at different speeds, the support being driven at a slightly lesser speed than the member, a second rotatable member eccentrically disposed with respect to the first member, a plurality of pivotally supported arms carried by the second member, shoes, slidable in the slots, pivotal connections between the shoes and the arms, a stationary shaft extending through the second rotatable member, a casing for the second rotatable member carried by the stationary shaft, and guides to direct bodies toward and away from the arms of the second stationary member carried by said casing.

4. A conveying and accelerating device including: a stationary shaft, a bevel gear loosely surrounding the shaft, a second bevel gear also loosely surrounding the shaft, means to drive the first bevel gear, gears to transmit motion from the first to the second bevel gear, a rotatable member, having slots, surrounding the shaft and driven from the first bevel gear, a support for bodies also surrounding the shaft and driven from the second bevel gear at a slightly lesser speed than that of the movable member, a rotatable member eccentrically disposed with respect to the first bevel gear, shoes slidably engaging the slots, and arms pivotally connected to the rotatable member and to the shoes.

5. A conveying and accelerating device including: a stationary shaft, a bevel gear loosely surrounding the shaft, a second bevel gear also loosely surrounding the shaft, means to drive the first bevel gear, gears to transmit motion from the first to the second bevel gear, a rotatable member, having slots, surrounding the shaft and driven from the first bevel gear, a support for bodies also surrounding the shaft and driven from the second bevel gear at a slightly lesser speed than that of the movable member, a rotatable member eccentrically disposed with respect to the first bevel gear, shoes slidably engaging the slots, arms pivotally connected to the rotatable member and to the shoes, a primary body separating and feeding device, and means to rotate said separating and feeding device from the first bevel gear.

6. A conveying and accelerating device including: a stationary shaft, a bevel gear loosely surrounding the shaft, a second bevel gear also loosely surrounding the shaft, means to drive the first bevel gear, gears to transmit motion from the first to the second bevel gear, a rotatable member, having slots, surrounding the shaft and driven from the first bevel gear, a support for bodies also surrounding the shaft and driven from the second bevel gear at a slightly lesser speed than that of the movable member, a rotatable member eccentrically disposed with respect to the first bevel gear, shoes slidably engaging the slots, arms pivotally connected to the rotatable member and to the shoes, a primary body separating and feeding device, a train of spur gears to rotate said primary device, and means to drive said train of spur gears from said first bevel gear.

Signed at Bridgeport, in the county of Fairfield and State of Connecticut this 9th day of September, 1926.

PAUL H. LANGE.